INVENTORS
KENNETH J. KENDALL
JOHN F. YURASEK
BY Herbert L. Davis
ATTORNEY

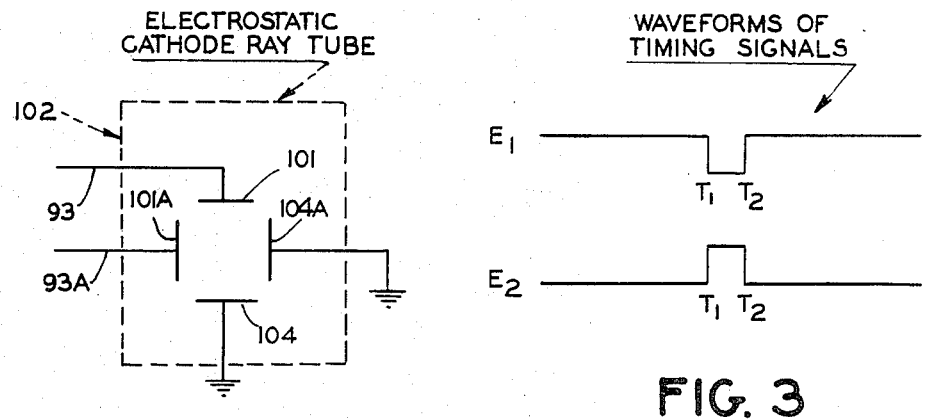
FIG. 2
FIG. 3
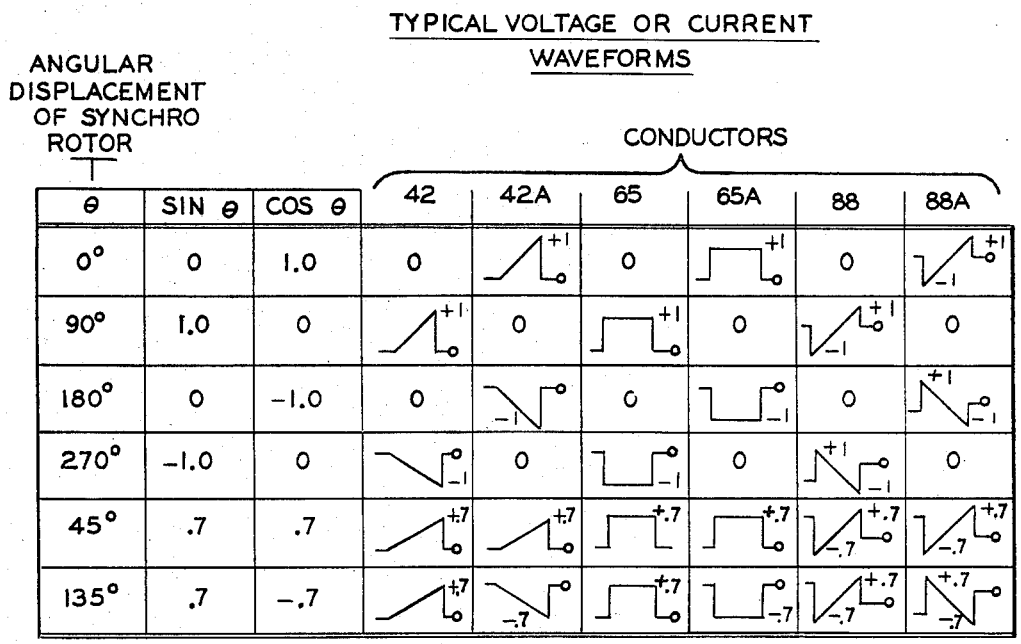
FIG. 4

3,471,742
ROTATIONAL STRAIGHT DISPLAY
LINE GENERATOR
Kenneth J. Kendall, Fairfield, and John F. Yurasek, Oakland, N.J., assignors to The Bendix Corporation, a corporation of Delaware
Filed June 17, 1968, Ser. No. 737,524
Int. Cl. H01j 29/70
U.S. Cl. 315—18    10 Claims

ABSTRACT OF THE DISCLOSURE

A rotational straight display line generator for the generation of electrical signals to be applied to yoke deflection coils or plates of a cathode ray tube; whereby, when used in aircraft, a straight line is displayed on the cathode ray tube representative of the horizon so that as the aircraft rotates around its longitudinal axis, commonly referred to as the roll axis, the straight line artificial horizon will rotate accordingly while its center point remains fixed.

In the generation of the horizon line, direct current voltage outputs of an external resolver, as a function of the sine and cosine of the angular displacement of the shaft of a synchro controlled by a vertical gyro, are applied to two integrating stages and to a first input of two differential amplification stages while the outputs of the integrating stages are applied to a second input of the differential amplification stages. The output of each differential amplification stage is in turn applied to a yoke deflection coil or plate of the cathode ray tube.

CROSS REFERENCES TO RELATED APPLICATIONS

The present invention relates to a control of a display on a cathode ray tube in a heads-up display system such as that disclosed and claimed in copending U.S. application Ser. No. 624,785 filed Mar. 21, 1967 by Francis Henry Sand Rossire and U.S. application Ser. No. 679,960 filed Nov. 1, 1967 by Abner Owens, Jr. and John F. Yurasek, both applications being assigned to The Bendix Corporation, assignee of the present invention.

BACKGROUND OF THE INVENTION

Field of the invention

The present invention relates to a display line generator for effecting signal currents to yoke deflection coils of an electromagnetic cathode ray tube or to deflection plates of an electrostatic cathode ray tube so as to display a straight line on tthe face of said cathode ray tube which may be rotated 360° and with the center point of the displayed straight line remaining fixed.

Description of the prior art

Prior to the present invention, it has been common practice to use electromechanical devices such as sine-cosine potentiometers to generate yoke deflection voltages. However, problems encountered in the use of electromechanical devices in airborne equipment application are such that the electromechanical devices have increased bulk and weight, while as electromechanical devices they have inherent low reliability compared to solid state electronic devices. The present invention, utilizing solid state components has less weight, less bulk and inherently higher reliability than an electromechanical device.

While a device disclosed in U.S. Patent No. 3,044,705 granted July 17, 1962 to C. C. Willhite rotates a straight line through 360°, that device differs from the present invention in that the straight lines formed by that device are used to generate an octagon pattern. The present invention rotates a straight line through 360° while the center point of the line remains fixed. Furthermore, the present invention substantially differs from the Willhite device in that the angular displacement of the resolver controls the present invention, while in the Willhite patent, the device controls the sine and cosine elements which may be of a resolver type.

The Willhite device further differs from the present invention in that Willhite uses at least four limiters indicated therein by the numerals 11, 12, 14 and 15, while the present invention does not use limiters. The integrators, one of which includes elements 21, 25, 31 and 35 while the other includes corresponding elements 21A, 25A, 31A and 35A of the present invention, are absent in the Willhite patent.

The disclosure of the Willhite patent relates to the generation of a pattern on a cathode ray tube and to a distinctly different mode of operation involving entirely different problems incident to the display of an octagon pattern which is incompatible with the provisions of a rotatable straight display line generator as in the present invention.

SUMMARY OF THE INVENTION

The present invention relates to the application of a direct current voltage, as a function of the sine of the angle of displacement of a synchro which by way of example may be controlled by a vertical gyro. This direct current voltage is connected to a first input of the present invention which applies the voltage to a first integrator including an operational amplifier, capacitor and MOS field effect transistor, and to a first input of a first differential amplifier, while the output of said integrator is in turn applied to a second input of said first differential amplifier where it experiences unity amplification. The gain of said first differential amplifier is such that the output of said first integrator is amplified by a factor of two.

The output current of said first differential amplifier is applied to another operational amplifier having an output applied to a first yoke deflection driver, which applies its output to a first means for deflecting an electron beam in a cathode ray tube about the Y axis.

The output current of said first differential amplifier will go to a negative value and increase to a positive value, equal to the negative value, linearly as a function of time for a positive direct current voltage input or the output current will go to a positive value and decrease to a negative value, equal to the positive value, linearly as a function of time for a negative direct current voltage input.

A direct current voltage output, as a function of the cosine of the angular displacement of the synchro's shaft, is also applied to a second input of the present invention which in turn applies the voltage to a second integrator including an operational amplifier, capacitor and MOS field effect transistor, and to a first input of a second differential amplifier where it experiences unity amplification. The output of the second integrator is connected to a second input of said second differential amplifier where it experiences an amplification factor of two.

The output of the second differential amplifier is connected to a fourth operational amplifier having an output applied to a second yoke deflection driver which applies its output to a second yoke deflection means for deflecting the electron beam of the cathode ray tube about the X axis.

An object of this invention is to provide novel integration, amplification and switching means for providing currents that are proportional to the sine and cosine of the angle of displacement of a rotor of a synchro for application to yoke deflection coils of an electromagnetic cathode ray tube or to deflection plates of an electrostatic cathode ray tube.

Another object of this invention is to provide in the aforenoted means a switching means in which the conduction and non-conduction of the switching means are related to the persistency of the display line on the face of a cathode ray tube so that other displays may be shown on the face of the cathode ray tube while the straight line as shown thereon may be rotatable about its center point.

Another object of this invention is to provide an energizing current that will start at a value of one polarity and terminate with the same value at an opposite polarity.

Another object is to provide a gain of two for one input of a differential amplifier and a gain of one for a second input of the differential amplifier.

These and other objects and advantages of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

DESCRIPTION OF THE DRAWINGS

In the drawings in which corresponding numerals indicate corresponding parts:

FIGURE 2 is a diagrammatic illustration of an electrostatic cathode ray tube to which the output of the rotatable straight display line generator of FIGURE 1 may be applied instead of to the electromagnetic cathode ray tube of FIGURE 1.

FIGURE 3 is a graphical representation of the waveforms of two voltages $E_1$ and $E_2$ provided by a timing signal source. The voltage waveform $E_1$ is provided by the timing signal source at a first level for a first predetermined period of time and then proceeds to a lower second level for a shorter second predetermined period of time and thereafter the timing signal source returns the voltage $E_1$ to the original higher first level for the first predetermined period of time. Voltage waveform $E_2$ is simultaneously at a lower first level initially and when $E_1$ goes from a higher first level to the lower second level provided by the timing signal source, it will be seen that in synchronism with the voltage $E_1$ the voltage $E_2$ is raised from the lower first level to the higher second level and remains at the higher second level for the same second time duration that $E_1$ remains at the lower second level, as shown graphically in FIGURE 3 by the comparative waveforms $E_1$ and $E_2$. Further, the timing signal source is so arranged that when $E_1$ returns to the higher first level, $E_2$ is immediately returned to its original low first level so that at all times the voltaeg $E_2$ is of opposite polarity to the voltage $E_1$ and the cycle of operation is continuously repetitive.

FIGURE 4 is a graphical table showing typical waveforms of current or voltages applied at conductors indicated by corresponding numerals of FIGURE 1, as a function of the angular displacement $\theta$ of the rotor of the synchro or signal device in which typical angles have been selected for illustration purposes inasmuch as the angular displacement $\theta$ of the rotor of the synchro signal device may vary from zero to 360 degrees.

DESCRIPTION OF THE INVENTION

Figure 1:
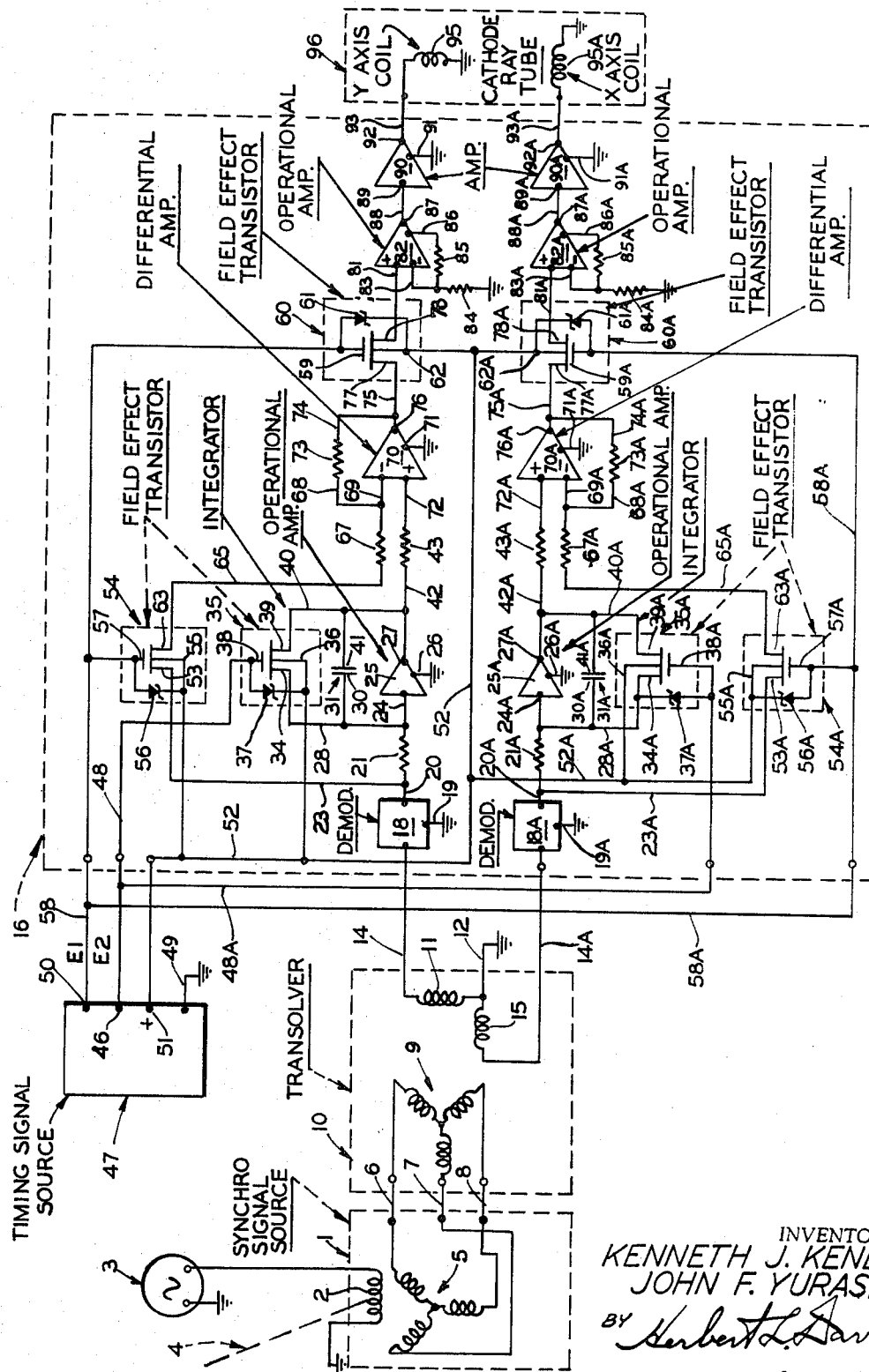
FIGURE 1 is a schematic wiring diagram of a rotatable straight display line generator embodying the present invention and shown applied to an electromagnetic cathode ray tube.

Referring to the drawing of FIGURE 1, there is indicated by the numeral 1 a synchro signal source having a rotor winding 2 energized by a source of alternating current 3 and angularly positioned by a shaft 4 which may, for example, be operatively controlled by a vertical gyro of conventional type. The rotor windings is inductively coupled to stator windings 5 having ends connected to output conductors 6, 7 and 8 while opposite ends of the stator windings 5 are connected together so as to provide on the output conductors 6, 7 and 8 alternating current output signals as a function of the angular displacement of the rotor winding 2 by the shaft 4 of the synchro 1 operatively positioned by the vertical gyro. The output conductors 6, 7 and 8 are connected to ends of stator windings 9 of a transolver 10 while opposite ends of the stator windings 9 are connected together.

A rotor winding 11 of the transolver 10 has one end connected by a conductor 12 to ground, while an opposite end of the winding 11 is connected to an output conductor 14. A second rotor winding 15 of the transolver 10 has one end connected by the conductor 12 to ground and its opposite end connected to an output conductor 14A. The output conductors 14 and 14A are connected to inputs of a network 16 for controlling the display at a cathode ray tube, as hereinafter explained.

The conductor 14 leads into the control network 16 and is connected to an input of a demodulator 18 having a grounded input-output terminal 19 and an output conductor 20. The conductor 20 is connected to one end of a resistor 21 and to a conductor 23. The opposite end of the resistor 21 is connected by a conductor 24 to an input of a conventional operational amplifier 25, having a grounded input-output terminal 26 and an output terminal 27. The operational amplifier 25, together with a capacitor 31 and a MOS field effect transistor 35 provides an integrator network. Thus a conductor 28 leads from the conductor 24 to a plate 30 of the capacitor 31 and to a source element 34 of the MOS field effect transistor 35 which may be of a conventional Raytheon type RM5008D, MOS field effect transistor.

Internally, the field effect transistor 35 has a substrate element 36 connected to a cathode element of a Zener diode 37 having an anode element connected to a gate element 38 of the transistor 35 and through a conductor 48 to an output terminal 46 of a timing signal source 47 of periodic electrical timing pulses $E_2$, shown graphically at FIGURE 3. The Zener diode 37 serves to clamp the voltage across the substrate element 36 and the gate element 38 of the field effect transistor 35 to prevent a breakdown of the field effect transistor 35 by preventing overvoltages in excess of a predetermined value arising across the substrate and gate elements.

A drain element 39 of said field effect transistor 35 is connected by a conductor 40 to a plate 41 of the capacitor 31 opposite to the plate 30 and to a conductor 42 leading from the output terminal 27 of the operational amplifier 25 to one end of a resistor 43.

The timing signal source 47 provides at terminals 46 and 50 electrical timing pulses $E_2$ and $E_1$, respectively, as shown graphically at FIGURE 3, and in addition, there is provided at a terminal 51 a positive direct current voltage, while a terminal 49 provides a common ground connection for the source of electrical energy 47. The substrate element 36 of the field effect transistor 35 is connected to a conductor 52 which in turn leads from the positive direct current voltage output terminal 51 of the source 47.

The conductor 23 which as heretofore noted leads from the output conductor 20 of the demodulator 18 is connected to a source element 53 of a MOS field effect transistor 54 of a type similar to the MOS field effect transistor 35. A substrate element 55 of the field effect transistor 54 is connected to the conductor 52 leading from the positive direct current voltage output terminal 51 of the source 47 and to a cathode element of a Zener diode 56 which in turn has an anode element connected to a gate element 57 of the field effect transistor 54. The gate element 57 is connected through a conductor 58 to the output terminal 50 of the timing signal source 47 of the periodic electrical timing pulses $E_1$, shown graphically at FIGURE 3.

The conductor 58 is also connected to a gate element 59 of a MOS field effect transistor 60 of a similar type to the MOS field effect transistor 35. A Zener diode 61 has an anode element connected to the gate element 59 of the field effect transistor 60 and a cathode element connected to a substrate element 62 of the field effect transistor 60. The substrate element 62 of the field effect transistor 60 is also connected to the conductor 52 leading to the positive direct current voltage output terminal 51 of the source 47.

A drain element 63 of the MOS field effect transistor 54 is connected by a conductor 65 to one end of a resistor 67 having an opposite end connected by a conductor 69 to a negative input terminal of a conventional differential amplifier 70 having a grounded input-output terminal 71.

Further, the resistor 43 heretofore noted as connected at one end to the output terminal 27 of the operational amplifier 25 is connected at an opposite end through a conductor 72 to a positive terminal of the differential amplifier 70. A conductor 68 leads from the negative input conductor 69 of the differential amplifier 70 to one end of a resistor 73 whose opposite end is connected by a conductor 74 to an output conductor 75 leading from an output terminal 76 of the differential amplifier 70.

The output conductor 75 leading from the differential amplifier 70 is connected to a source element 77 of the MOS field effect transistor 60 while a drain element 78 of the field effect transistor 60 is connected by a conductor 81 to a positive terminal of a conventional operational amplifier 82. A negative terminal of the operational amplifier 82 is connected by a conductor 83 to a resistor 84 and to a resistor 85. The opposite end of the resistor 84 is connected to ground and the opposite end of the resistor 85 is connected through a conductor 86 to an output terminal of the operational amplifier 82. Another output terminal 87 of the amplifier 82 is connected to a conductor 88 which in turn is connected to an input terminal 89 of a conventional amplifier 90 having a grounded input-output terminal 91. An output terminal 92 of the amplifier 90 is connected by a conductor 93 to a Y axis yoke deflection coil 95 of an electromagnetic cathode ray tube 96 of conventional type. The opposite end of the Y axis yoke deflection coil 95 is connected to ground.

The output of rotor winding 15 of the transolver 10, appearing on the conductor 14A, is operated on in the same manner as the output of rotor winding 11 of transolver 10, appearing on conductor 14, so that in FIGURE 1 the elements with numerals having the letter A as a suffix are connected in the same manner and have the same values and functions as the elements having corresponding numerals without the A suffix, and the output of an amplifier 90A is connected by a conductor 93A to the end of an X axis yoke deflection coil 95A of the conventional electromagnetic cathode ray tube 96 while an opposite end of the X axis yoke deflection coil 95A is connected to ground.

The resistor 21, the operational amplifier 25, the capacitor 31 and the MOS field effect transistor 35 along with the conductors 24, 28, 40 and 42 form a conventional integrator of a type similar to the integrator 1 stage of the analog computer shown in FIGURE 8–27 at page 266 of "Electron Tube Circuits," second edition, by Dr. Samuel Seely and published by the McGraw-Hill Book Company. The resistor 21A, the operational amplifier 25A, the capacitor 31A and the MOS field effect transistor 35A along with the conductors 24A, 28A, 40A and 42A also form a similar type of integrator.

OPERATION

The vertical gyro operating the synchro signal source 1 may be mounted in an airplane so that any rotation of the airplane around a longitudinal axis, commonly referred to as the roll axis, of the airplane causes the control shaft 4 of the synchro operated by the vertical gyro to angularly position the rotor 2 of the synchro 1 through an angle $\theta$ which is equal to the angle of displacement of the airplane around its roll axis.

The displacement of the rotor 2 of the synchro 1 varies an alternating current voltage output appearing on the conductors 6, 7, 8, as a function of the angle of displacement $\theta$. The alternating current voltage outputs are applied to the stator windings 9 of the transolver 10. The rotor windings 11 and 15 translate the applied voltages into alternating current voltages as a function of the sine and cosine of the angle of displacement $\theta$. The sine function of the alternating current signal voltage is developed across the rotor winding 11 and across the conductors 12 and 14. The alternating current signal voltage is applied to the input of the demodulator 18 through the conductor 14.

The cosine function of the alternating current voltage is developed across rotor winding 15 and across the conductors 12 and 14A and is applied to said demodulator 18A through the conductor 14A. Demodulators 18 and 18A demodulates the alternating curent voltages into direct curent voltages which are functions of the sine and cosine, respectively, of the angle of displacement $\theta$ of the rotor 2 of the synchro 1.

The direct current voltage output of the demodulator 18 is applied to the conductor 20 which in turn applies it to the conductor 23 and to the resistor 21. The resistor 21 applies the direct current voltage to the input terminal 24 of the operational amplifier 25 and to the conductor 28 which in turn applies the input voltage to the plate 30 of the capacitor 31 having the opposite plate 41 connected through conductor 40 to the conductor 42 leading from the output terminal 27 of the operational amplifier 25, while the input conductor 28 is also connected to the source element 34 of the field effect transistor 25.

The resistor 21 acting in conjunction with the operational amplifier 25, the capacitor 31 and the field effect transistor 35 integrates the direct current voltage output at the demodulator 18, as hereinafter explained.

At all times, the positive direct current voltage, present at terminal 51 of the timing signal source 47, is applied to the substrate elements 36, 36A, 55, 55A, 62 and 62A of the MOS field effect transistors 35, 35A, 54, 54A, 60 and 60A, respectively, to prevent forward biasing of the substrate elements 36, 36A, 55, 55A, 62 and 62A.

At a predetermined time designated as $T_1$, shown for purposes of illustration by the comparative waveforms of FIGURE 3, the direct current output periodic timing pulses $E_2$ present at the terminal 46 of the timing signal source 47 goes from a low level to a high level, in practice this change may be from a low level of $-15$ volts to a high level of $+5$ volts. The pulsating voltage $E_2$ present at the terminal 46 of the timing source 47 is applied through the conductor 48 to the gate element 38 of the field effect transistor 35.

The source element 34 of the transistor 35 sees the output voltage of the demodulator 18, which in practice may vary from a $-5$ volts direct current to a $+5$ volts direct current. This output voltage of the demodulator 18 varies as a function of the angular displacement of the rotor 2 of the synchro 1 by the shaft 4 operatively controlled by the vertical gyro. The increase in the voltage difference between the gate element 38 of the MOS field effect transistor 35 and the source element 34, which will vary from 10 volts to 20 volts in actual practice, causes an increase in resistance between the source element 34 of the transistor 35 and the drain element 39 thereof so that current cannot flow through the path formed by the resistor 21, the conductor 28, the source element 34, the drain element 39 and the conductor 40 so that in effect the field effect transistor 35 acts as an open switch. Since there is no longer a shunt path in parallel with the capacitor 31, the direct current voltage being applied to the operational amplifier 25 and the plate 30 causes the capacitor 31 to charge up.

Prior to the capacitor 31 being completely charged, the pulsating voltage $E_2$ present at the output terminal 46 of the timing signal source 47 goes from the high level to the lower level at a time $T_2$ thereby causing a reduction in resistance between the source element 34 and the drain element 39 of the MOS field effect transistor 35 so that a bypass path now exists through resistor 21, the conductor 28, the source element 34, the drain element 39 and the conductor 40 to the output conductor 42 so in effect the MOS field effect transistor 35 acts as a closed switch by passing the capacitor 31 and the operational amplifier 25.

The pulsating voltage $E_2$ appearing then at output terminal 46 of the timing signal source 47 is actually a series of positive going timing pulses, each of which pulses in practice may have a pulse width of 640 microseconds, the time interview from $T_1$ to $T_2$, and a pulse repetition rate of 49 pulses per second.

The output voltage of the operational amplifier 25 is applied to the conductor 42 which in turn applies the voltage to the resistor 43. The typical waveforms that appear on the conductor 42 for the indicated displacement angles of the rotor 2 of the synchro 1 by the operation of the vertical gyro appear in the column bearing the heading "conductor 42" of FIGURE 4 for the time interval between the time $T_1$ and the time $T_2$ of the positive going timing pulse $E_2$ supplied on the control line 48 leading from the timing signal source 47.

Meanwhile, the output of the demodulator 18 applied to the conductor 23 is in turn applied to the source element 53 of the field effect transistor 54. The pulsating voltage $E_1$ is present at the output terminal 50 of said timing source 47 and is applied to the conductor 58 leading to the gate element 57 of the field effect transistor 54. The voltage $E_1$, as shown graphically by FIGURE 3, is a series of negative going timing pulses. Each of the pulses $E_1$ are at a high level and go to a low level at the same time $T_1$ that the voltage $E_2$, present at output terminal 46, goes from the lower level to the higher level so that the voltages on conductors 48 and 58 are at all times at opposite levels.

Thus, at the time that the voltage on the conductor 58 is at the high level, the resistance between the source element 53 and the drain element 63 of the field effect transistor 54 is high thereby preventing the direct current output voltage of the demodulator 18, appearing on the conductor 20, from being applied to the conductor 65 and in turn to the resistor 67. However, at the time $T_1$, the voltage output $E_1$ at the terminal 50 of the timing signal source 47 goes to the lower level thereby reducing the resistance between the source element 53 and the drain element 63, as heretofore explained, of the field effect transistor 35, so that the direct current voltage output of the demodulator 18 is applied to the resistor 67.

Now at the time $T_2$, the voltage $E_1$ at the output terminal 50 rises to the original higher level thereby causing an increase of resistance between the source element 53 and the drain element 63 of the field effect transistor 54, thus again preventing the output voltage of the demodulator 18 from being applied to the resistor 67 through the conductor 65.

Thus, as a result of the foregoing, the resistor 67 sees a voltage waveform as indicated by the column "conductor 65," for the various angles of the rotor of the synchro 1, as indicated in FIGURE 4.

The input conductor 69 of the differential amplifier 70 is connected through the conductors 68 and 74 and the resistor 73 to the conductor 75 leading from the output terminal 76 of the differential amplifier 70 so that the resistor 73 serves as a feedback resistor which acts with the resistor 67 providing a gain of one in the negative input at the conductor 69 of the differential amplifier 70. Thus, the negative input applied through conductor 69 to the input terminal of the differential amplifier 70 experiences a rectangular waveform, as shown graphically by FIGURE 4, under the designation conductor 65.

Thus, in the event of an output from the demodulator 18 of greater than, or less than, zero volts, the input conductor 72 leading from the resistor 43 to the positive terminal of the differential amplifier 70 applies a saw tooth voltage wave, as shown graphically by FIGURE 4 under the designation conductor 42, which results from the integration of the direct current voltage output of the demodulator 18 by the resistor 21, the operational amplifier 25, the capacitor 31 and the field effect transistor 35. The value of the resistor 43 is one-half of the value of the resistor 67, as well as being one-half of the value of the resistor 73, so as to yield a gain of two for the input applied by conductor 72 to the positive input terminal of the differential amplifier 70.

Just prior to the time $T_1$, the input applied through conductor 72 to the positive input terminal of the differential amplifier 70 sees zero voltage due to the voltage drop across the resistor 21 as a result of the current flowing through the MOS field effect transistor 35. Meanwhile, the input applied through the conductor 69 to the negative input terminal of the differential amplifier 70 does not see a voltage, since MOS field effect transistor 54 has a high resistance just prior to the time $T_1$.

At the time $T_1$, MOS field effect transistor 54 conducts and the conductor 69 leading to the negative input terminal of the differential amplifier 70 will see a voltage greater than zero which is assumed for purposes of illustration as a value of 1 volt. At the time $T_1$, transistor 35 stops conducting causing amplifier 25 to have an output starting at zero and increasing as a function of the charging of capacitor 31. The differential amplifier 70 will then apply a negative output of $-1$ volt at the time $T_1$ since the input applied through conductor 69 to the negative input terminal of the differential amplifier 70 is one volt greater than the input applied through conductor 72 to the positive input terminal of the differential amplifier 70 and the difference is amplified by a factor of one and is inverted. The output is applied to the source element 77 of the MOS field effect transistor 60.

Since the gate element 59 of the field effect transistor 60 is connected to the conductor 58, as is the gate element 57 of the field effect transistor 54, the MOS field effect transistor 60 conducts during the same time interval that the MOS field effect transistor 54 conducts so that during the time interval between the time $T_1$ and the time $T_2$, the output of the differential amplifier is applied to the input terminal 81 of the operational amplifier 82.

The output voltage of the operational amplifier 25 increases linearly as a function of the time as a result of a positive voltage output from the demodulator 18 and the charging up of the capacitor 31. At mid-point between the time $T_1$ and the time $T_2$, the differential amplifier 70 will have applied through the conductor 72 to the positive input terminal of the differential amplifier 70 one-half of the voltage that is applied through conductor 69 to the negative input terminal of the differential amplifier 70.

Since the gain associated with the positive input terminal of the differential amplifier 70 is a gain of two, the two input voltages of the differential amplifier 70 will cancel out resulting in the output of the differential amplifier 70 at 76 being zero volts midway between the time $T_1$ and the time $T_2$. At the time $T_2$, the MOS field effect transistor 60 stops conducting, as heretofore explained, thereby blocking the output of the differential amplifier 70.

Just immediately prior to the time $T_2$, the voltage output of the operational amplifier 25 was equal to the voltage being applied through conductor 69 to the negative input of the differential amplifier 70. However, since the gain at the positive input terminal of the differential amplifier 70 and applied through conductor 72 is a gain of two, the differential amplifier 70 has a positive output of 1 volt. If the direct current voltage from the demodulator 18 is a negative voltage, the output of the differential amplifier 70 would go to a positive level at the time $T_1$ and decrease linearly as a function of time until immediately prior to the time $T_2$ it will reach a positive level equal to, in value, the negative level at the time $T_1$.

If the angle of displacement of the rotor 2 of the synchro 1 operated by the vertical gyro is zero degrees, the sine function output is zero voltage. There is no voltage present for the elements 21, 25, 31 and 35 to integrate. This condition results in a zero voltage being applied through the conductor 72 to the positive input of the differential amplifier 70. Meanwhile, there is also zero voltage being applied through conductor 69 to the negative input terminal of the differential amplifier 70; therefor, the output at the output terminal 76 of the differential amplifier 70 is zero volts.

When the MOS field effect transistor 60 conducts, the output of the differential amplifier 70 is applied to the input conductor 81 of the operational amplifier 82. The operational amplifier 82 is a unity gain amplifier; that is, the output voltage appearing at the output terminal 87 is equal to the input voltage that is applied to the input conductor 81. The unit gain is achieved by having the resistance value of the resistor 84 equal to the resistance value of the resistor 85 and having the resistor 85 connected from the output conductor 86 to the input conductor 83. The operational amplifier 82 is used to create a high resistance to eliminate any error due to changes in resistance emanating from the switching effect of MOS field effect transistor 60. If the present invention is not used in a multiple display system, then operational amplifier 82 may be omitted.

The output of operational amplifier 82 appearing at the terminal 87 is applied to the conductor 88 which in turn applies it to an input terminal 89 of an amplifier 90. The amplifier 90 is used as a yoke deflection coil driver of sufficient gain to amplify the input necessary to produce the deflection currents in the Y axis yoke deflection coil 95 which is connected to the output terminal 92 by the conductor 93. The yoke deflection coil 95, when energized, deflects the electron beam in the cathode ray tube 96 as a function of the current passing through the coil 95.

The voltage output of transolver 10 developed across the rotor winding 15 as a function of the cosine of the angle of displacement of the rotor 2 of the synchro 1 by the shaft 4 operated by a vertical gyro is applied to the demodulator 18A.

As heretofore explained, the alternating current voltage that is a function of the cosine of the angle of displacement of the rotor winding 2 is operated on in the same manner as the sine voltage and through elements having a suffix A and numerals corresponding to the elements in the system that operated on the sine function voltages. The elements having suffixes A are connected in the same manner and have the same values and functions as the elements having corresponding numerals without the A suffix.

At the 90° angle, only the Y axis yoke deflection coil 95 is deflecting the electron beam in the cathode ray tube 96. At the 0° angle of displacement, only the X axis yoke deflection coil 95A is deflecting the electron beam in the cathode ray tube 96. If the angle of displacement of the rotor winding 2 of the synchro is 45°, the direct current voltage appearing on the conductor 20 would be .7 of the assumed 1 volt level so that the saw tooth wave that will appear on the output conductor 42 of the operational amplifier 25 would rise from a zero reference to a 0.7 level before being terminated by the conduction of field effect transistor 35. However, the cosine function output of the transolver 10 results in demodulator 18A having a 0.7 voltage level and the output voltage of the operational amplifier 25A appearing on the conductor 42A would also rise from a zero reference to a 0.7 voltage level so that the output currents of the differential amplifiers 70 and 70A would be equal thereby causing the Y axis yoke deflection coil 95 and the X axis yoke deflection coil 95A to deflect the electron beam equally in the electromagnetic cathode ray tube 96.

It should be noted that the deflection of an electron beam causes a line to be traced on the face of the cathode ray tube 96 since the zero reference for the Y axis yoke deflection coil 95 is at the same point of the zero reference for the X axis yoke deflection coil 95A, the line will always pass through one point, the center point, on the face of the cathode ray tube 96. As the rotor winding 2 of the synchro 1 is rotated by the vertical gyro through an angle, the direction of the line will change, but since it always passes through the same center point, it will simulate the rotation of the horizon line to a pilot or copilot looking at the cathode ray tube 96.

The line displayed on a cathode ray tube is generally repeated 49 times per second. A lesser repetition rate would effect the display of the line to the extent that a viewer could notice the difference. The present invention is contemplated being used with multiple displays on cathode ray tubes. To achieve this, the switching by the MOS field effect transistors are accomplished for a time of display of 640 microseconds repeated 49 times per second. During a one second time interval, 31.36 milliseconds have been consumed in displaying the artificial horizon line leaving 968.64 milliseconds during which time the electron beam of the cathode ray tube may be deflected by other circuitry for other displays.

The present invention is also applicable to electrostatic cathode ray tubes as illustrated by FIGURE 2 wherein the output voltages appearing on the conductors 93 and 93A are applied to Y axis and X axis electrostatic plates 101 and 101A, respectively, of an electrostatic cathode ray tube 102, whose opposite plates 104 and 104A are connected to ground.

While several embodiments of this invention have been illustrated and described, various changes in the form and relative arrangements of the parts, which will now appear obvious to those skilled in the art may be made without departing from the scope of the invention. Reference is, therefore, to be had to the appended claims for a definition of the limits of the invention.

What is claimed is:

1. For use in a display system of a type including a cathode ray tube having a pair of operating means and a display face, and an electrical signal source having an angularly displaceable operating means and a pair of electrical outputs, one of said electrical outputs providing an electrical output signal as a function of a sine of an angular displacement of the operating means of said signal source and a second of said electrical outputs providing an electrical output signal as a function of a cosine of said angular displacement of the operating means of said signal source; the combination comprising means for generating electrical signals for the pair of operating means of the cathode ray tube to provide a straight line image on the face of the cathode ray tube rotatable about a fixed point, said generating means including first and second electrical networks, each of said first and second networks including means for processing a different one of the outputs of the signal source, said processing means including means for periodically integrating said one of the outputs of the signal source, switching means for periodically passing the one output of the signal source simultaneously with the integration of the one output, and means for combining outputs of the integrating means and the switching means to provide a resultant output signal, first means for operatively connecting the resultant output signal from the combining means of said first network to one of said pair of operating means of the cathode ray tube, and second means for operatively connecting the resultant output signal from the combining means of said second network to the other of said pair of operating means of the cathode ray tube, and the resultant output signals connected by said first and second connecting means to said pair of operating means of the cathode ray tube causing the straight line image on the face of the cathode ray tube to pass through the fixed point; and timing means connected to the networks for rendering the processing means of one network simultaneously effective in relation to the processing means of the other network so as to cause the straight line image to be displayed on the face of the cathode ray tube in an angular position movable about the fixed point in a corresponding relation to the angular displacement of the operating means of said signal source.

2. A rotational straight line generator as defined by claim 1 wherein the combining means includes a first resistor element connected to the output of the switching means; a second resistor element connected to the output of the integrating means and said second resistor element having a resistance value one-half the resistance value of said first resistor element; a differential amplifier having first and second inputs and an output, the first input of the differential amplifier being connected to the first resistor element and the second input being connected to the second resistor element, and the output of the differential amplifier being connected to the operating means of the display system; and a third resistor element equal in resistance value to the first resistor element, the third resistor element being connected between the output and the first input of the differential amplifier to effect an output from said combining means that corresponds to the difference between the output of the switching means after being amplified by a factor of one and the output of the integrating means after being amplified by a factor of two.

3. A rotational straight line generator as defined by claim 1 wherein the timing means includes a source of periodic electrical timing pulses for controlling the periodic processing of the output of said signal source providing for the simultaneous integration and passing of the output signals of said signal source by both networks and causing a deflection of an electron beam in the cathode ray tube corresponding to the angular displacement of the operating means of said signal source.

4. A rotational straight line generator as defined by claim 3 including a source of direct current electrical energy and wherein the switching means includes a field effect transistor having a source element, a drain element, a gate element and a substrate element, said source element being connected to one output of the signal source, said gate element being connected to the source of the electrical timing pulses, said drain element being connected to one input of the combining means, and the substrate element being connected to the source of direct current electrical energy, and said field effect transistor providing for increasing or decreasing internal resistance between the source element and the drain element in response to the periodic electrical pulses from said timing source to effect a periodic passing of the output from the signal source.

5. A rotational straight line generator as defined by claim 3 including a source of direct current electrical energy and wherein the integrating means includes a resistor element connected to the signal source, and an operational amplifier having an input and an output, said input being connected through the resistor element to the signal source and said output being connected to one input of the combining means, a capacitor having a first plate connected to the input of said operational amplifier and a second plate of said capacitor connected to the output of said operational amplifier, and a field effect transistor having a source element, a drain element, a gate element and a substrate element, said source element being connected to the input of said operational amplifier, said gate element being connected to the periodic electrical pulses from said timing source, said drain element being connected to the output of the operational amplifier, and the substrate element being connected to the source of direct current electrical energy, said field effect transistor alternately increasing and decreasing internal resistance between said source element and said drain element in response to the periodic electrical pulses from the timing source to effectively bypass the capacitor upon the internal resistance being effectively decreased and effectively cause the capacitor to be charged upon the internal resistance being increased resulting in the operational amplifier and capacitor integrating the output of the signal source appearing on the resistor element during the time interval of the increased internal resistance between the source element and the drain element.

6. A rotational straight line generator as defined by claim 3 wherein the first and second connecting means are first and second field effect transistors, each having a source element, a drain element, a gate element and a substrate element, said source element being connected to the output of the combining means, said gate element being connected to the source of the electrical timing pulses, said drain element being connected to one of the operating means of the cathode ray tube, and the substrate element being connected to the source of direct current electrical energy, and said field effect transistors varying internal resistance between the source element and the drain element in response to the periodic electrical pulses from said timing source to effect a periodic passing of the output from the combining means simultaneously with the passing of the outputs from the signal source by the switching means.

7. A rotational straight line generator as defined by claim 3 including a source of direct current electrical energy and wherein the switching means includes a first field effect transistor having a source element, a drain element, a gate element and a substrate element, said source element being connected to the output of the signal source, said gate element being connected to the source of the electrical timing pulses, and said substrate element being connected to the source of direct current electrical energy, the first field effect transistor alternately increasing and decreasing internal resistance between the source and the drain element of the first field effect transistor in response to the periodic electrical pulses from said timing source to effect a cyclical passing of the output from the signal source, and wherein the integrating means includes a first resistor element connected to the signal source and an operational amplifier having an input and an output, said input being connected through the first resistor element to the signal source, a capacitor having a first plate connected to the input of said operational amplifier and a second plate of said capacitor connected to the output of said operational amplifier, a second field effect transistor having a source element, a drain element, a gate element and a substrate element, said source element being connected to the input of said operational amplifier, said gate element being connected to the periodic electrical pulses from said timing source, said drain element being connected to the output of the operational amplifier, and the substrate element being connected to the source of direct current electrical energy, said second field effect transistor alternately increasing and decreasing internal resistance between said source element and said drain element of the second field effect transistor in response to the periodic electrical pulses from the timing source to effectively bypass the capacitor upon the internal resistance being effectively decreased and effectively causing the capacitor to be charged upon the internal resistance being increased resulting in the operational amplifier and capacitor integrating the output of the signal source appearing on the first resistor element during the time interval of the increased internal resistance between the source element and the drain element and wherein the combining means includes a second resistor element connected to the drain element of the first field effect transistor, a third resistor element connected to the output of the operational amplifier and said third resistor element having a resistance value one-half the resistance value of said second resistor element, the combining means including a differential amplifier having first and second inputs and an output, the first input of the differential amplifier being connected to the second resistor element and the second input being connected to the third resistor element, the combining means including a fourth resistor element equal in resistance value to the second resistor element, the fourth resistor element being connected between the output and the first input of the differential amplifier to effect an output from said combining means that corresponds to the difference between the output of the drain element of said first field effect transistor after being amplified by a factor of one and the output of the operational amplifier after being amplified by a factor of two.

8. A rotational straight line generator as defined by claim 7 wherein the first and second connecting means are third and fourth field effect transistors, each of said third and fourth transistors having a source element, a drain element, a gate element and a substrate element, said source element being connected to the output of the differential amplifier, said gate element being connected to the source of the electrical timing pulses, said drain element being connected to one of the operating means of the cathode ray tube and the substrate element being connected to the source of direct current electrical energy, and each of said third and fourth transistors alternately increasing and decreasing internal resistance between the source element and the drain element in response to the periodic electrical pulses from said timing source to effect a periodic passing of the output from the combining means simultaneously with the passing of the outputs from the signal source by the switching means.

9. A method of generating a straight line rotatable about a fixed point on a face of a cathode ray tube in response to sine and cosine outputs of a signal source and corresponding to the angular condition of the signal source, said method comprising the steps of integrating the sine output and the cosine output of the signal source for a predetermined time interval, amplifying the sine output of the signal source by a factor of one and the integrated sine output by a factor of two during the predetermined time interval, amplifying the cosine output of the signal source by a factor of one and the integrated cosine output by a factor of two during the predetermined time interval, applying a difference between the amplified sine output of the signal source and the amplified integrated sine output of the signal source and the amplified integrated sine output so as to effect a deflection of an electron beam of the cathode ray tube in a first sense simultaneously with applying a difference between the amplified cosine output and the amplified integrated cosine output so as to effect a deflection of the electron beam of the cathode ray tube in another sense during the predetermined time interval.

10. A method of generating a straight line rotatable about a fixed point on a face of a cathode ray tube including effecting a cyclical repetition of the steps defined by claim 9.

References Cited
UNITED STATES PATENTS

| | | | |
|---|---|---|---|
| 3,345,632 | 10/1967 | Rover | 343—108 |
| 3,339,203 | 8/1967 | Curry | 343—108 |
| 3,305,865 | 2/1967 | Gassler | 343—5 |

RODNEY D. BENNETT, JR., Primary Examiner

JOSEPH G. BAXTER, Assistant Examiner

U.S. Cl. X.R.

343—5, 108